P. L. CRAIG.
Hay-Loader.

No. 162,221.

Patented April 20, 1875.

Witnesses:
A. Schattenberg
H. P. Schnetsky

Inventor:
Pascal L. Craig
By J. B. Smith
his Atty in fact

THE GRAPHIC CO. PHOTO-LITH. 39 & 41 PARK PLACE, N.Y.

UNITED STATES PATENT OFFICE.

PASCAL L. CRAIG, OF EAST TROY, ASSIGNOR OF ONE-HALF HIS RIGHT TO HENRY C. STRATTON, OF COLDWELL'S PRAIRIE, WISCONSIN.

IMPROVEMENT IN HAY-LOADERS.

Specification forming part of Letters Patent No. 162,221, dated April 10, 1875; application filed August 14, 1874.

*To all whom it may concern:*

Be it known that I, PASCAL L. CRAIG, of East Troy, in the county of Walworth, in the State of Wisconsin, have invented certain Improvements in Hay-Loaders, of which the following is a specification:

My invention is for the purpose of loading hay from the ground onto wagons, and is accomplished by an apparatus secured to the body of a wagon, and dragged along behind the wagon, with teeth which catch under the hay, and levers which catch their ends into the ground, and the forward movement of the wagon raises them up and tips the hay over onto the wagon.

Figure 1:
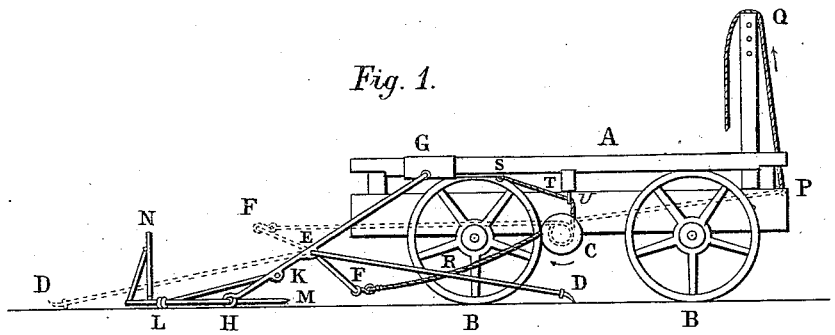
Figure 2:
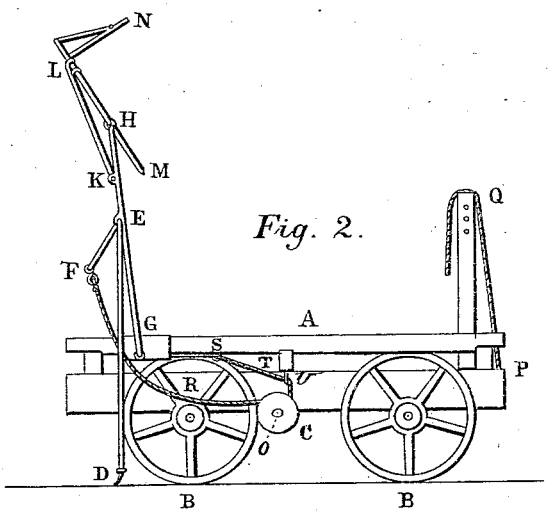
Figure 3:
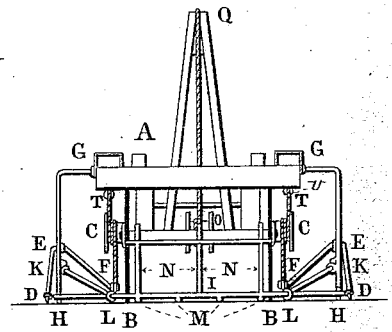

Figure 1 is a view of a wagon, and side view of my invention. Fig. 2 is a view of a wagon and view of my invention raised up, and Fig. 3 is a rear view of a wagon and my invention.

A is the wagon-body, on which the hay is loaded; B, the wheels of the wagon, which convey the wagon over the ground; C, a wheel in the middle of the wagon, on a shaft under the wagon-body, to which ropes are attached, which extend to the loader, and also ropes which are attached to slides on the under sides of the wagon-body, which slides hold the arms of the hay-loader in place, and whenever it is necessary to drop the arms of the hay-loader this wheel C is revolved by rope P, which turns it far enough to pull on the slides and draw them out, and let the arms fall; D, the end of a lever, with a stop a little way from the end of it, which prevents the lever from entering the ground too far. This lever D is for the purpose of catching the end of it in the ground, and as the wagon moves along tilts up on end, and raises the loader. E, a joint in arm K, to which lever D is attached, and revolves in it; F, the other end of lever D, to which is attached a rope. The other end of said rope is hitched onto wheel C. This lever D and F is crooked, so that as the wheel C turns and pulls on the rope attached to F the end D is raised, and is thrown over and strikes and catches in the ground, and raises the arms K and the loader.

G, the crooked end of arm K, entering the journal-box, held in position by slides S; H, joint of arm K, with the head-piece which holds the teeth, which slide under the hay as it lies on the ground; I, the cross-bar to which the teeth are attached; K, side pieces or arms of the loader, which are crooked at the upper end, and revolve on slides S, and to which the head and teeth of the loader are attached; L, a sliding lever, one end sliding in a socket on the arm K, and the other end with an eye on it, through which the side pieces of the head and cross-bar slide. A stop on the side piece prevents it from sliding too far in one direction, and the cross-bar of the head prevents it sliding too far in the other. This lever regulates the tip of the head. M, the teeth which gather the hay; N, the framework or head of the loader back of the teeth for holding the hay; O, the shaft, on the end of which are wheels C; P, a rope, attached to the center of shaft O, with which to revolve it, so as to make the loader operate; Q, an upright shaft or post in the forward end of the wagon-body, over which the end of rope P passes; R, rope from the end F of lever D, and attached to wheel C, with which lever D is tilted over so as to operate the loader; S, a slide under the wagon-body, and which holds the ends of arms K in position; T, a rope from wheel C, connected with S; U, a runner, through which rope T runs.

This machine is operated as follows: The loader lies on the ground, and as the wagon is moved along the teeth M run under the hay and gather it, and when there is enough on the teeth for a load the person on the wagon pulls on rope P, which revolves shaft O, and wheel C pulls on rope R, which tilts over lever D, so that it occupies position shown by Fig. 1, and as the wagon moves along the end D of the lever sticks in the ground, and the loader is raised to the position shown by Fig. 2, and the hay slides from the loader onto the wagon, and is taken and loaded by the man on the load, and as the wagon moves along the loader falls back into the position, Fig. 3, ready for another operation, and when the load is completed, then pull on rope P and roll shaft O farther than it was rolled to operate the loader, and that will pull on rope T, and pull slide S back, and arms K will be disengaged and fall to the ground, and the loader will remain there till wanted again.

I claim as my invention—

1. Lever D, arms K, sliding lever L, cross-bar I, and teeth M, in combination with wheel C and rope R, substantially as described.

2. The combination of rope T, slide S, and wheel C, substantially as described.

PASCAL L. CRAIG.

Witnesses:
JOHN WOOD,
HENRY CADY.